United States Patent
Koch et al.

(10) Patent No.: US 11,620,664 B2
(45) Date of Patent: Apr. 4, 2023

(54) DETECTION OF USAGE OF A PHYSICAL ENVIRONMENT

(71) Applicant: AT&T Intellectual Property I, L.P., Atlanta, GA (US)

(72) Inventors: Robert Koch, Norcross, GA (US); Nikhil Marathe, Palatine, IL (US); James Pratt, Round Rock, TX (US); Ari Craine, Marietta, GA (US); Eric Zavesky, Austin, TX (US); Timothy Innes, Atlanta, GA (US); Nigel Bradley, Canton, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 17/861,945

(22) Filed: Jul. 11, 2022

(65) Prior Publication Data

US 2022/0343347 A1    Oct. 27, 2022

Related U.S. Application Data

(63) Continuation of application No. 16/709,720, filed on Dec. 10, 2019, now Pat. No. 11,416,878.

(51) Int. Cl.
| | |
|---|---|
| *G06Q 30/00* | (2012.01) |
| *G06Q 30/0201* | (2023.01) |
| *G06F 3/01* | (2006.01) |
| *H04W 4/021* | (2018.01) |
| *G06Q 30/0251* | (2023.01) |
| *G06Q 30/04* | (2012.01) |
| *H04W 4/029* | (2018.01) |

(52) U.S. Cl.
CPC ......... *G06Q 30/0201* (2013.01); *G06F 3/013* (2013.01); *G06Q 30/0261* (2013.01); *G06Q 30/0267* (2013.01); *G06Q 30/04* (2013.01); *H04W 4/021* (2013.01); *H04W 4/029* (2018.02)

(58) Field of Classification Search
CPC ....... H04W 4/029; H04W 4/021; G06F 3/013; G06Q 30/04
See application file for complete search history.

(56) References Cited

U.S. PATENT DOCUMENTS

| | | | |
|---|---|---|---|
| 5,703,367 | A | 12/1997 | Hashimoto et al. |
| 7,061,393 | B2 | 6/2006 | Buckingham et al. |
| 9,148,935 | B2 | 9/2015 | Mohan et al. |
| 9,575,180 | B2 | 2/2017 | Miller et al. |

(Continued)

FOREIGN PATENT DOCUMENTS

WO    2017139376 A1    8/2017

OTHER PUBLICATIONS

Akkaya, et al., "IoT-BASED Occupancy Monitoring Techniques for Energy-Efficient Smart Buildings", IEEE Wireless Communications and Networking Conf. Workshop—Energy Efficiency in the Internet of Things, and Internet of Things for Energy Efficiency, 2015, pp. 58-63.

(Continued)

*Primary Examiner* — Alvin L Brown
(74) *Attorney, Agent, or Firm* — Guntin & Gust, PLC; Douglas Robert Schnabel

(57) ABSTRACT

Methods, systems, and apparatuses may provide for the auto-determination of partial usage of a physical environment and use derived intelligence to take various actions. This may allow for partial resulting maintenance of the physical environment based on a single use or use over time.

20 Claims, 5 Drawing Sheets

(56) References Cited

U.S. PATENT DOCUMENTS

| | | |
|---|---|---|
| 10,197,979 B2 | 2/2019 | Warren et al. |
| 10,310,477 B2 | 6/2019 | Sinha et al. |
| 2007/0265859 A1 | 11/2007 | Jachner |
| 2011/0071951 A1 | 3/2011 | John |
| 2013/0289952 A1 | 10/2013 | Marwah et al. |
| 2014/0239821 A1 | 8/2014 | Leonard |
| 2015/0235333 A1 | 8/2015 | Bangerter et al. |
| 2016/0110833 A1 | 4/2016 | Fix et al. |
| 2016/0162985 A1 | 6/2016 | Alhakim |
| 2017/0039632 A1 | 2/2017 | Meagher et al. |
| 2017/0331908 A9 | 11/2017 | Grohman |
| 2018/0143601 A1 | 5/2018 | Chavan et al. |
| 2018/0189864 A1 | 7/2018 | Allison et al. |
| 2019/0065888 A1 | 2/2019 | Calenzo et al. |
| 2019/0120804 A1 | 4/2019 | Hoff |
| 2019/0172165 A1 | 6/2019 | Verteletskyi et al. |
| 2020/0250774 A1 | 8/2020 | Agarwal et al. |

OTHER PUBLICATIONS

Conte, et al., "Bluesentinel: A First Approach Using IBEACON for an Energy Efficient Occupancy Detection System", BuildSys. Sensys., 2014, 9 pages.

Vattapparamban, et al., "Indoor Occupancy Tracking in Smart Buildings Using Passive Sniffing of Probe Requests", IEEE Workshop on Advances in Network Localization and Navigation, 2016, 7 pages.

Zou, et al., "Non-Intrusive Occupancy Sensing in Commercial Buildings", Energy and Buildings, vol. 154, 2017, pp. 633-643.

DETECTION OF USAGE OF A PHYSICAL ENVIRONMENT

CROSS REFERENCE TO RELATED APPLICATIONS

This application is a continuation of U.S. patent application Ser. No. 16/709,720 filed on Dec. 10, 2019. All sections of the aforementioned application are incorporated herein by reference in their entirety.

BACKGROUND

Some localization technologies are directed at determining the presence of a device or user within a virtual perimeter of a given geographical landscape. The virtual boundaries of the virtual perimeter can be used for various applications such as asset management and tracking, automatic house arrest monitoring systems, and location based targeted advertising. Yet the adaptability and use of such virtual perimeters may be improved. This disclosure is directed to addressing issues in the existing technology.

This background information is provided to reveal information believed by the applicant to be of possible relevance. No admission is necessarily intended, nor should be construed, that any of the preceding information constitutes prior art

SUMMARY

Disclosed herein are methods, systems, and apparatuses that provide for the auto-determination of partial usage of a physical environment and use derived intelligence to take various actions. This may allow for partial resulting maintenance of the physical environment based on a single use or use over time.

In an example, an apparatus may include a processor and a memory coupled with the processor that effectuates operations. The operations may include detecting a mobile device in proximity to a physical environment, the physical environment is virtually divided into a plurality of sub-environments; based on the detecting of the mobile device in proximity to the physical environment, activating sensors within the physical environment; obtaining usage information of the physical environment based on sensor data from the sensors; based on the usage information, determining a usage pattern within the physical environment of a user associated with the mobile device; and based on the usage pattern, managing one or more interactions associated with a first sub-environment of plurality of sub-environments of the physical environment.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

DETAILED DESCRIPTION

Disclosed herein are methods, systems, and apparatuses that provide for the auto-determination of partial usage of a physical environment and uses that derived intelligence to take various actions. This may allow for partial resulting maintenance of the physical environment based on a single use or use over time.

Figure 1:
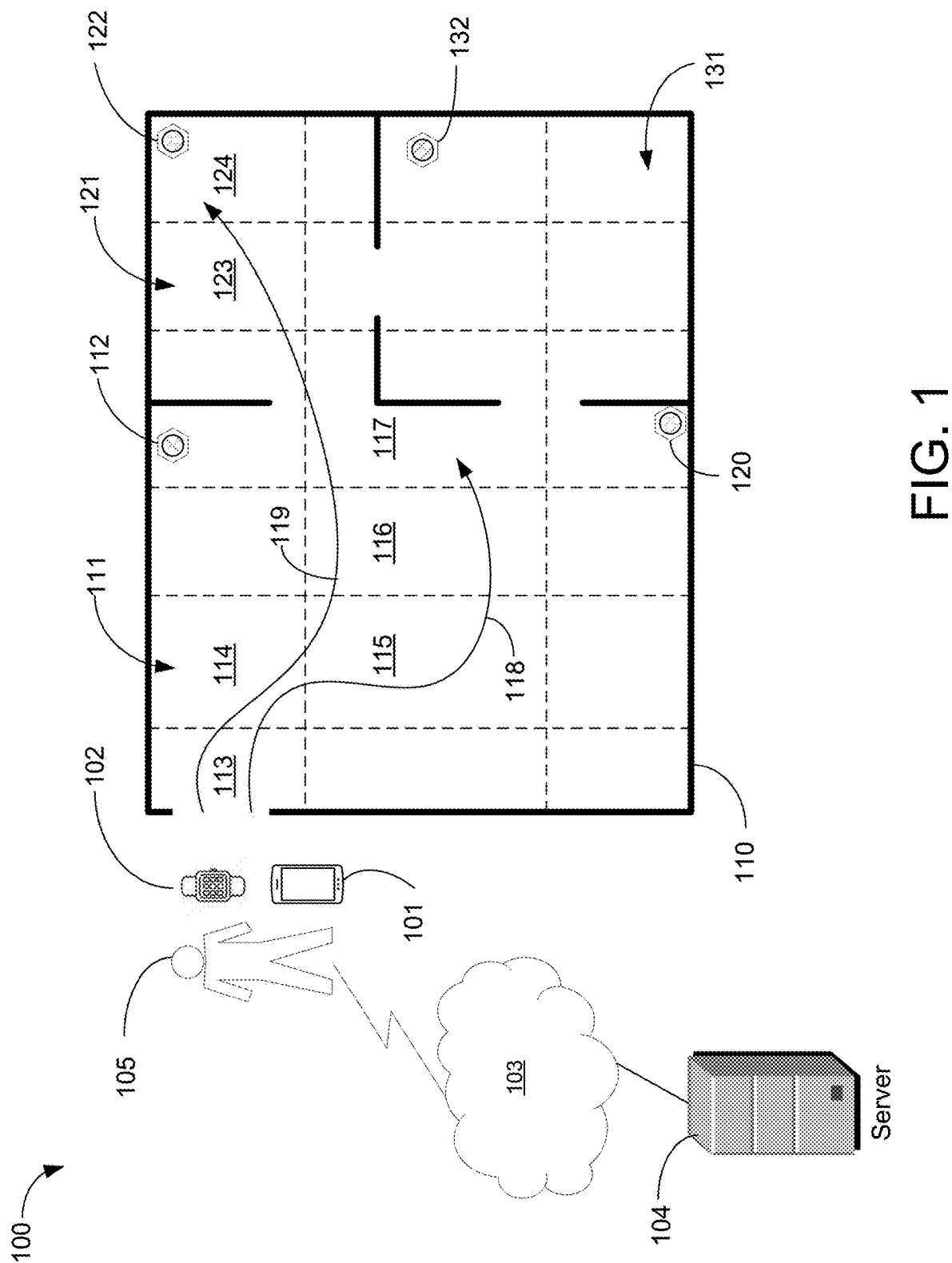
FIG. 1 illustrates an exemplary system for detection of usage of physical environment.

FIG. 1 illustrates an exemplary system for detection of usage of physical environment 110. System 100 may include multiple devices, such as mobile device 101, mobile device 102, sensor 112, sensor 122, sensor 132, or environment usage monitor (EUM) 104 that may be communicatively connected with each other using wireless, wireline, or network 103. EUM 104 (e.g., a server) may manage detection, assessment, and alerts associated with physical environment 110. Mobile device 101 or mobile device 102 may be associated with user 105. Mobile device 102 may be a smart watch and mobile device 101 may be a smartphone. It is contemplated that mobile device 101 or mobile device 102 may include wireless devices, such as portable digital assistants (PDAs), laptop computers, tablet devices, smart phones, smart watches, smart glasses, autonomous or unmanned vehicles, augmented reality devices, virtual reality devices, or the like.

Physical environment 110 includes room 111, room 121, and room 131, which may include multiple sensors or other devices, such as sensor 112, sensor 120, sensor 122, or sensor 132. Physical environment 110 may be a rental unit such as a house, a museum, a concert venue, a sports stadium or arena, school, office, or any number of other places. As shown, the physical environment 110 may be divided into sub-environments (e.g., sub-environment 113—sub-environment 117, sub-environment 123, and sub-environment 124). As disclosed in more detail herein, EUM 104 may use information associated with the sub-environments in determining usage of physical environment 110 and directing the management of interactions of physical environment 110. Lines 118 and line 119 show exemplary paths that user 105 may take through physical environment 110 during a first period (e.g., hour or day). Line 118 may be based on information captured by one or more devices, such as mobile device 101, mobile device 102, sensor 112, or sensor 120 (e.g., motion sensors or beacons), among other things. In an example, line 118 may be based on an average over time of obtained information from the one or more devices. The sensors (e.g., sensor 120) may include an environmental sensor, acoustic sensor, sound sensor, vibration sensor, fluid sensor, optical sensor, position sensor (e.g., accelerometer or gyroscope), speed sensor, chemical sensor, pressure sensor, camera, or the like. Sensor 120 may be substantially integrated into an object (e.g., a camera or television) or may be a stand-alone device.

Figure 2:
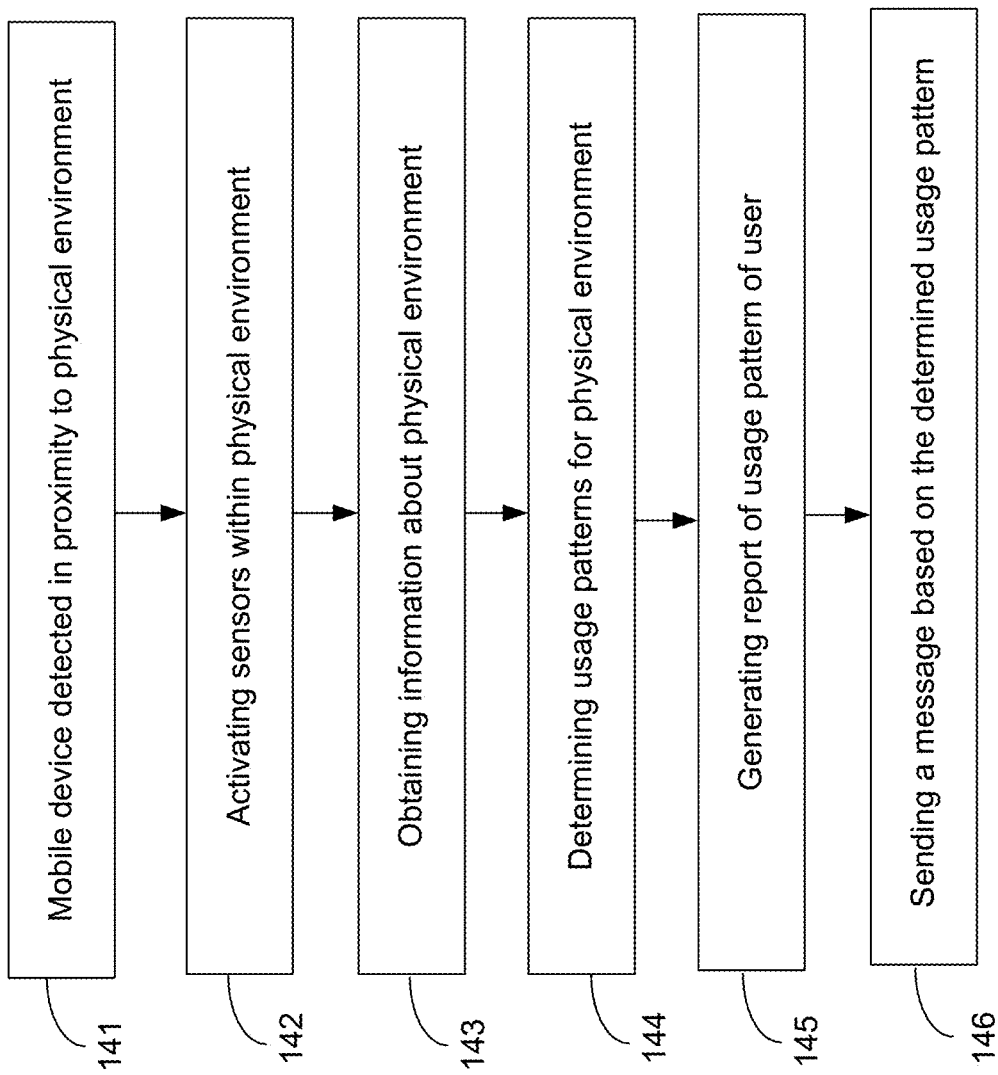
FIG. 2 illustrates an exemplary method for detection of usage of physical environment.

FIG. 2 illustrates an exemplary method for detection of usage of physical environment. At step 141, mobile device 102 may be detected in proximity (e.g., within 50 feet) to physical environment 110. User 105 may have mobile device 102 (or mobile device 101), such as a smartphone, smartwatch, or token or other holdable, wearable, or implantable mobile device. User 105 may also have an interface to mobile device 102 using a virtual assistant that communicates with the user via a speech, visual, or audible interfaces. At step 142, responsive to detecting mobile device 102 in proximity to physical environment 110, activating sensors (e.g., sensor 112 or sensor 120) within physical environment 110. The sensors may have been in sleep mode or the like and then awakened based on the proximity of mobile device 102. In addition, sensors within mobile device 102 that are not in use may be activated, such as a camera, accelerometer, gyroscope, magnetometer, GPS, proximity sensor, pedometer, thermometer, air humidity sensor, or microphone (e.g., for virtual assistant), among other things. It is contemplated that based on the profile of the device/user the sensors may not be activated or different sensors may be activated. For example, the owner that is just doing a general inspection may not wish to be tracked. In another example, if the sensor is a camera, then the camera may be deactivated when a tenant is occupying physical environment 110 but activated when housekeeping is inside physical environment 110. In another example, heating and cooling may be activated when a tenant is occupying or proximate to physical environment 110 but deactivated when housekeeping is inside physical environment 110. Further to this housekeeping example, if how long housekeeping is there is tracked, it may tie to their hourly rate and provide transparency into billing or which areas were most dirtied or otherwise disturbed. The time spent maintaining may directly map to a user's bill if their usage is determined to be a correlated. Charging based on usage may incur additional fees based on clean up time. This may be particularly useful in environments like hotels where optimization at scale is beneficial.

With continued reference to FIG. 2, at step 143, obtain usage information about physical environment 110, which may include the usage of physical environment 110 by user 105. The usage information about physical environment 110 may be obtained from at least the activated sensors of step 142. The movement of user 105 may be tracked (e.g., as represented by line 118 and line 119). Other usage information about physical environment 110 may include user 105 smoking for a period in sub-environment 115, user 105 sitting for a period in sub-environment 115, user 105 standing for a period in sub-environment 115, user 105 quickly (or slowly) walking through sub-environment 115, or user 105 interacting with an object (e.g., television, oven, table, chair, lamp, painting, or computer) in sub-environment 115, among other things. At step 144, based on the usage information obtained at step 143, determining usage patterns for physical environment 110 over a period (e.g., minutes, hours, or days). The usage patterns may be based on intensity of the use that may include the frequency of use in combination with the usage information above. Frequency of use may be based on primarily the number of times user 105 is within sub-environment 113. Intensity of use may include frequency of use among other information, such as user 105 interaction with an object, user 105 sitting, user 105 standing, user 105 laying, user 105 exercising, user 105 smoking, weather (e.g., rain may increase likelihood of mud on user footwear), or number of users, among other things. The frequency of use may allow for automated ordering of supplies. For example, frequently visiting the fridge, bathroom, pantry, coffee pot, among other things may cause for respective ordering of refrigerated foods, toilet paper and towels, snack foods, coffee, or the like. The determined usage pattern may include a usage level (e.g., 90 out of 100) or a usage path (e.g., line 118 and line 119).

With continued reference to FIG. 2, at step 145, generating report of the usage pattern of physical environment 110. The report may include numerical or text data about usage patterns (e.g., usage level or path) or a graphical (e.g., heat map) indication of usage patterns in each physical environment, room, or sub-environment (see FIG. 3 which is discussed in more detail below). It is contemplated that the determined usage patterns may be filtered based on a particular user(s), a group of users, time, date, weather, sensor used (e.g., sensor 120 or sensor 112), or user 105 profile (e.g., user city, state, age, hobbies, etc.), among other things. At step 146, sending a message based on the determined usage pattern. The message may be to a maintenance or a cleaning service and the message may indicate areas of physical environment 110 that the maintenance or cleaning service should focus on (e.g., sub-environment 114 or sub-environment 117). In another example, the message may be sent based on the usage pattern (e.g., usage level) reaching a threshold usage level. For instance, if usage level of room 111 reached 90 (out of 100), then a message may be sent to a cleaning service to clean before its scheduled timeframe. If the level is 90 over an extended period, then a message may be sent to replace all or part of a carpet or other object (e.g., automated ordering as disclosed herein). In another example, the message may be sent to an unmanned or autonomous vehicle, such as robot vacuum, robot floor scrubber, or other robot cleaning machine. The robot cleaning machine may traverse the usage path or the indicated sub-environments that reach a threshold usage level.

Figure 3:
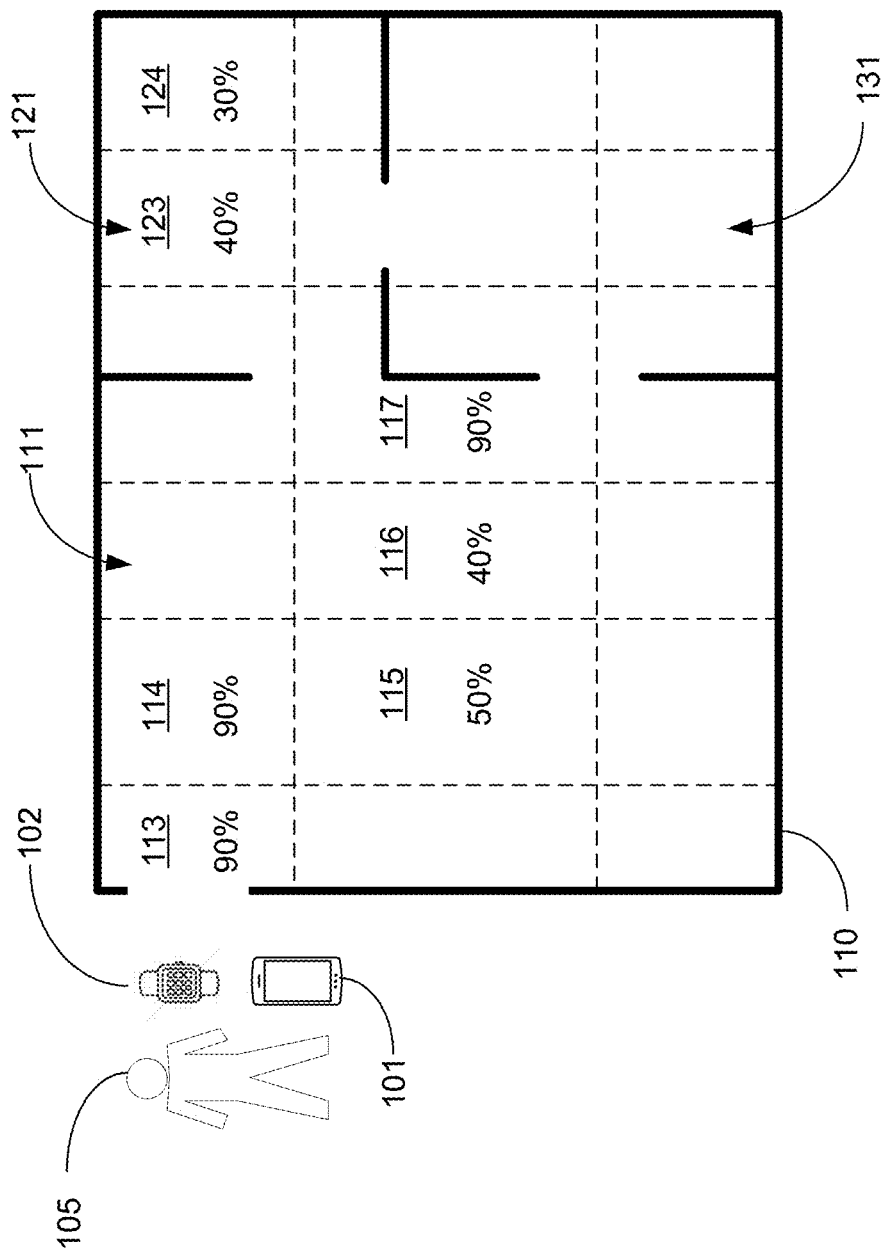
FIG. 3 illustrates an exemplary output of a system for detection of usage of a physical environment.

FIG. 3 illustrates an exemplary output of a system for detection of usage of a physical environment. As shown, physical environment 100 may include room 111, room 121, and room 131, which have grid lines that divide them into sub-environments, such as sub-environment 113—sub-environment 117, sub-environment 123, or sub-environment 124, among others. User 105 may carry mobile device 101 and mobile device 102. Based on mobile device 101, mobile device 102, and other sensors, the usage pattern of user 105 may be determined. Table 1 provides the usage patterns for each sub-environment illustrated in FIG. 3. In this example, usage by user 105 was observed in some sub-environments of room 111 and room 121, but no usage was observed in room 131. Therefore, in this instance, room 131 (and the objects within) may be cleaned or otherwise maintained (replace light bulbs or empty trash) less frequently than room 111 or room 121.

Disclosed in more detail below are additional aspects and further considerations associated with detection of usage of physical environment. As disclosed herein, profile information of user 105 (or mobile device 102) may be shared when mobile device 102 (or user 105) is detected. This profile information may be used to relate the obtained data to user 105 or mobile device 102. In an example, physical presence of user 105 may be detected within room 111 and sub-environment 114. This may be detected via location data sent from mobile device 102 to EUM 104 and associated with profile information of user 105 which may include user ID, time data, or historical usage patterns of user 105. In another example, sensor 120 may detect motion and the profile information of user 105 on their device or biometric data to identify user 105 and send the user ID, location, or time data to EUM 104. The record may be made at EUM 104 that the user has begun use of room 111 and sub-environment 114 within it. The usage pattern of room 111 or sub-environment 114 may include recorded movement into and out of room 111 or sub-environment 114. EUM 104 may map the location of user 105 into a virtual area.

In an example scenario, at the end of a stay of user 105 at physical environment 110 (e.g., a rental property, museum, or school), EUM 104 may determine the usage pattern and prepare a report. The report may include a summary of how much time the user spent in each sub-environment, room, or the like. Based on the report, actions may be taken by EUM 104 or mobile device 102. For example, an action may be to send a message to mobile device 102 of user 105 to confirm that the determined usage pattern or other report information is accurate for maintenance or billing purposes. For instance, EUM 104 may instruct a billing application to prorate the bill of user 105 so they are charged a lesser amount.

Based on the usage pattern, which may be separated by user, then a bill may be prorated or divided up between users, or a use of a facility (e.g., shared office space) may be charged based on the usage pattern (e.g., time, intensity, or frequency) rather than a flat rate. In an example scenario, user 105 may be charged for only the pieces of art that they observe in a museum. The observation by user 105 of a piece of art may be determined by proximity of mobile device 102 to a beacon, allowing, for instance, user 105 to be charged for observing the Mona Lisa and the Venus de Milo (which may be at sub-environment 123 and sub-environment 124, respectively), but not Winged Victory at the Louvre, which may be in room 131. The observations of user 105 may also be determined by line of sight estimation techniques, or data from mobile device 101 (e.g., smart eyeglasses or contact lenses). It is contemplated that a combination of sensor information may be used to determine the location and actions of user 105.

In another scenario, the line of sight of user 105 may be used to determine what advertisements user 105 sees, for instance at a sports stadium. The line of sight of user 105 towards an advertisement display may be determined via mobile device 101 (e.g., smart glasses, smartphones, or contacts) or via line-of-sight estimation techniques. The period of time of the observation may also be recorded. User 105 may receive a credit for their observation of the advertisement from an advertisement application. This credit may be sent to mobile device 102 and may be recorded in an electronic wallet on mobile device 102. Via mobile device 102, user 105 may be notified frequently or notified in real-time of usage pattern or running tally of charges or credits based on usage of physical environment 110 by user 105. In another scenario associated with the sports stadium (or the like) venue, the system for detection of usage of a physical environment may be used to implement a seat roaming system. There may be a determination that ticket holders with premium seats (e.g., club access) are not being used by the half-way mark of a game. Based on that determination, a message may be sent to users with less desirable seats to purchase roaming access for the premium seats. In this way, the venue may be able to further capitalize on the premium seats and user 105 may be able to upgrade his/her experience.

In another scenario, EUM 104 may detect an attempt by user 105 to use a portion of physical environment 110 but not bill for it if it was not desirable for it to be used. For example, if user 105 is detected to be at an outdoor pool location at a hotel at 5:45 pm and then leaves at 5:50 pm, EUM 104 may compare this record with weather data collected at the time proximate to the location of physical environment 110. EUM 104 may determine that there was a lightning strike nearby at 5:50 pm and send a message to a billing application to remove a charge associated with the outdoor pool location from the bill or otherwise prorate the bill.

Figure 4:
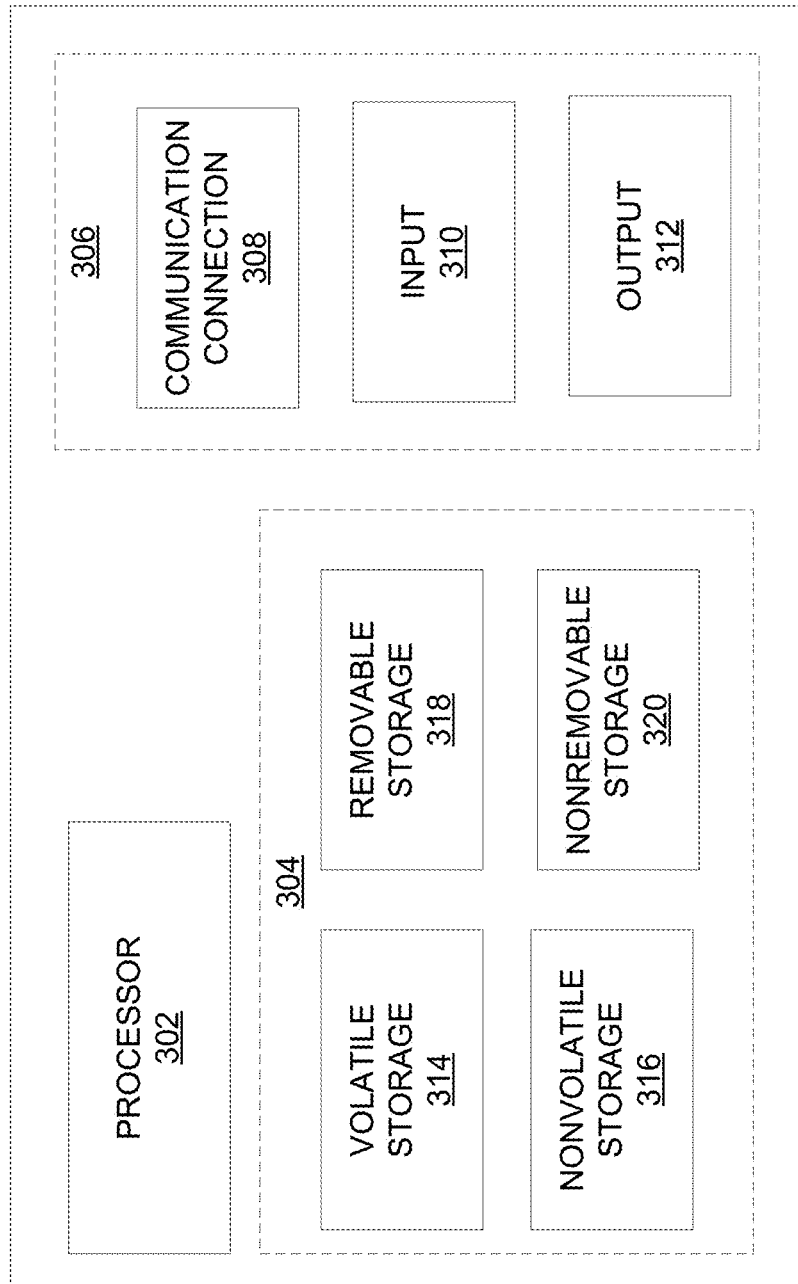
FIG. 4 illustrates a schematic of an exemplary network device.

FIG. 4 is a block diagram of network device 300 that may be connected to or comprise a component of system 100. Network device 300 may comprise hardware or a combination of hardware and software. The functionality to facilitate telecommunications via a telecommunications network may reside in one or combination of network devices 300. Network device 300 depicted in FIG. 4 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an automatic location function server (ALFS), a gateway mobile location center (GMLC), a radio access network (RAN), a serving mobile location center (SMLC), or the like, or any appropriate combination thereof. It is emphasized that the block diagram depicted in FIG. 4 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength. As evident from the description herein, network device 300 is not to be construed as software per se.

In addition to processor 302 and memory 304, network device 300 may include an input/output system 306. Processor 302, memory 304, and input/output system 306 may be coupled together (coupling not shown in FIG. 4) to allow communications between them. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example, input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 5:
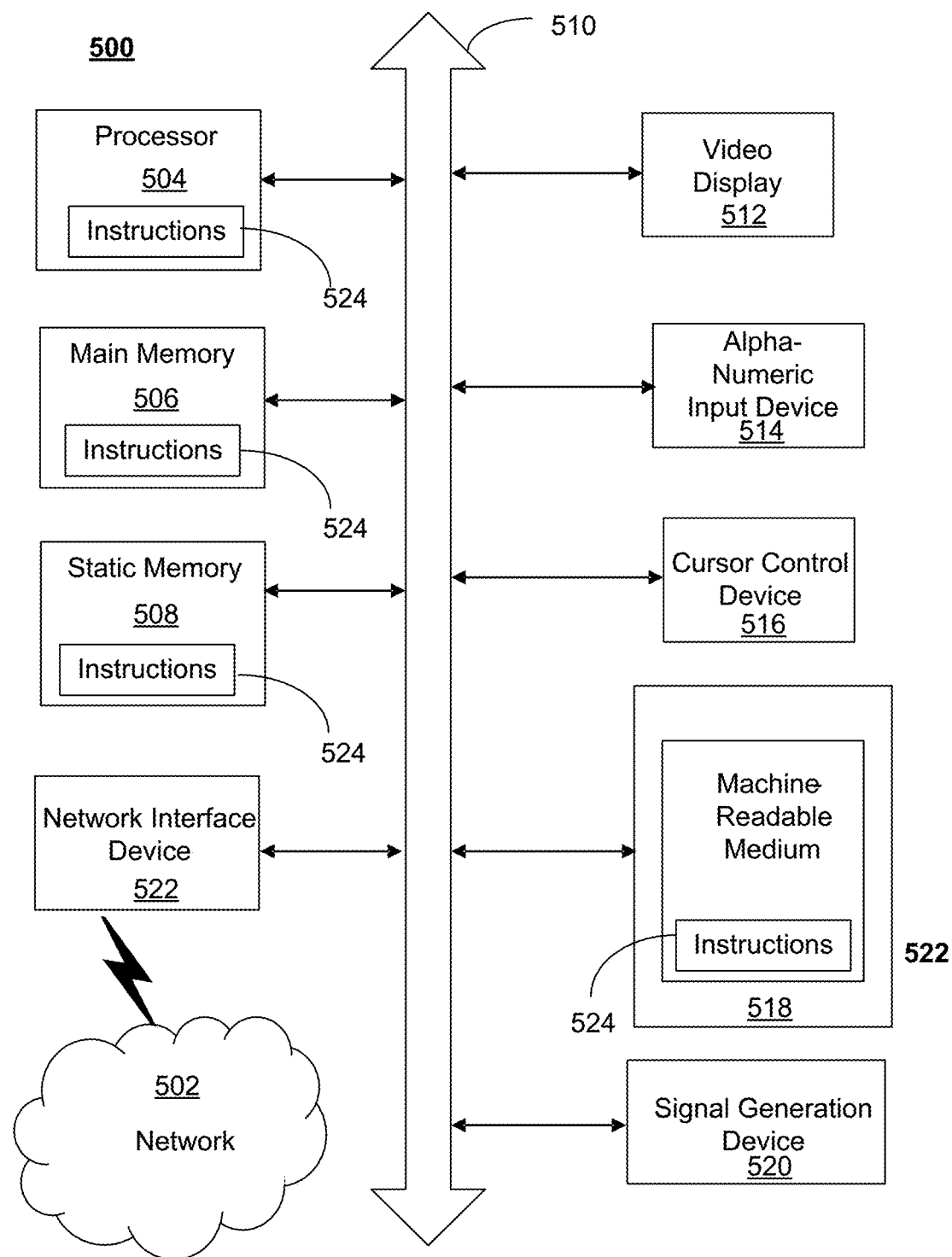
FIG. 5 illustrates an exemplary communication system that provides wireless telecommunication services over wireless communication networks.

FIG. 5 depicts an exemplary diagrammatic representation of a machine in the form of a computer system 500 within which a set of instructions, when executed, may cause the machine to perform any one or more of the methods described above. One or more instances of the machine can operate, for example, as processor 302, mobile device 101, mobile device 102, sensor 120, and other devices of FIG. 1. In some examples, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the examples described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

As described herein, a telecommunications system may utilize a software defined network (SDN). SDN and a simple IP may be based, at least in part, on user equipment, that provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a system in which usage of a physical environment can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes a device for implementing telecommunications as described herein. When implemented on a general-purpose processor, the program code combines with the processor to provide a unique device that operates to invoke the functionality of a telecommunications system.

While the disclosed systems have been described in connection with the various examples of the various figures, it is to be understood that other similar implementations may be used, or modifications and additions may be made, to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, the disclosed systems as described herein should not be limited to any single example, but rather should be construed in breadth and scope in accordance with the appended claims.

In describing preferred methods, systems, or apparatuses of the subject matter of the present disclosure—detecting usage of a physical environment—as illustrated in the Figures, specific terminology is employed for the sake of clarity. The claimed subject matter, however, is not intended to be limited to the specific terminology so selected. In addition, the use of the word "or" is generally used inclusively unless otherwise provided herein.

This written description uses examples to enable any person skilled in the art to practice the claimed subject matter, including making and using any devices or systems and performing any incorporated methods. The patentable scope is defined by the claims, and may include other examples that occur to those skilled in the art.

Methods, systems, and apparatuses, among other things, as described herein may provide for detecting usage of a physical environment. A method, system, computer readable storage medium, or apparatus may provide for detecting a mobile device in proximity to a physical environment; based on the detecting of the mobile device in proximity to the physical environment, activating sensors within the physical environment; obtaining usage information of the physical environment based on sensor data from the sensors; based on the usage information, determining a usage pattern within the physical environment of a user associated with the mobile device; and generating a report of the usage pattern of the user within the physical environment. The physical environment may be virtually divided into a plurality of sub-environments. the usage pattern may include a usage level of each sub-environment of the plurality of sub-environments, wherein each sub-environment may include a corresponding usage level. A method, system, computer readable storage medium, or apparatus may provide for based on the usage pattern reaching a threshold usage level, sending a message to a maintenance service to maintain a first sub-environment of the plurality of sub-environments. The usage pattern may include a usage path through a plurality of sub-environments of the physical environment. A method, system, computer readable storage medium, or apparatus may be based on the usage pattern indicating the user traversing a threshold usage path, sending a message to a maintenance service to maintain a first sub-environment of the plurality of sub-environments. The usage information may include whether the user was smoking or interacting with an object, such as an appliance (e.g., oven, stove, or dishwasher). The usage pattern may be further determined by the weather. A method, system, computer readable storage medium, or apparatus may provide for based on reaching a threshold usage level, managing one or more interactions associated with a sub-environment of the physical environment. The managing one or more interactions may include sending an alert (e.g., message) to the mobile device (e.g., smartwatch of a cleaning person), wherein the alert may include instructions for the user to proceed to a location (e.g., kitchen, trash receptacle, hamper, dishwasher, washing machine) and place appropriate items (e.g., trash, dishes, towels, or sheets) in the appropriate location (e.g., trash receptacle, hamper, dishwasher, washing machine). A method, system, computer readable storage medium, or apparatus provide for based on the usage pattern, managing one or more interactions associated with a first sub-environment of plurality of sub-environments of the physical environment. The usage pattern may include a usage path of the user associated with the mobile device. The usage pattern may include a usage level of each sub-environment of the plurality of sub-environments. The managing of one or more interactions may include sending a message to an unmanned vehicle to maintain a first sub-environment of the plurality of sub-environments. The managing one or more interactions may include sending a message to the mobile device, wherein the message may include information associated with a fee for maintaining a first sub-environment of the plurality of sub-environments. The sensors may include a camera. The sensors may be fixed sensors in the physical environment or other sensors, which may be on the mobile device of the user traversing the physical environment. The managing one or more interactions may include generating a heat map associated with the usage pattern of the physical environment. It is contemplated herein that the methods herein may be executed on EUM 104, mobile device 101, mobile device 102, or distributed among devices throughout a plurality of devices. A method, system, computer readable storage medium, or apparatus may provide for detecting a mobile device in proximity to a physical environment, the physical environment may be virtually divided into a plurality of sub-environments; based on the detecting of the mobile device in proximity to the physical environment, obtaining usage information of the physical environment based on sensor data from sensors; and based on the usage information, managing one or more interactions associated with the user's usage of a first sub-environment of plurality of sub-environments of the physical environment. The managing one or more interactions may include sending a message to an unmanned vehicle (e.g., unmanned aerial vehicle or automobile that may drive autonomously) to maintain a first sub-environment of the plurality of sub-environments. All combinations in this paragraph (including the removal or addition of steps) are contemplated in a manner that is consistent with the other portions of the detailed description.

What is claimed:

1. An apparatus comprising:
a processing system including a processor; and
a memory coupled with the processing system and storing executable instructions that when executed by the processing system cause the processing system to perform operations comprising:
obtaining first intensity of usage information according to first sensor data from a first sensor collected according to a first profile associated with a first user of a first mobile device detected in proximity to a physical environment and second intensity of usage information according to second sensor data from a second sensor collected according to a second profile associated with a second user of a second mobile device detected in proximity to the physical environment, wherein the first sensor and the second sensor are different sensors; and
based on the first intensity of usage information and the second intensity of usage information, managing first interactions associated with first usage, by the first user, of a first sub-environment of a plurality of sub-environments of the physical environment and second interactions associated with second usage, by the second user, of the first sub-environment of the plurality of sub-environments.

2. The apparatus of claim 1, wherein the managing the first interactions comprises sending an alert to maintain the physical environment commensurate with the first intensity of usage information.

3. The apparatus of claim 1, wherein the managing the first interactions comprises sending a message to an unmanned vehicle.

4. The apparatus of claim 1, wherein the managing the first interactions comprises sending a message to the first mobile device, wherein the message provides an offer for the first user to upgrade seating in a venue.

5. The apparatus of claim 1, wherein the managing the first interactions comprises determining observations of the first user based on a line of sight estimation technique.

6. The apparatus of claim 5, wherein the line of sight estimation technique is used in conjunction with information from smart glasses.

7. The apparatus of claim 5, wherein the operations further comprise selecting an advertisement for the first user to view based on the observations of the first user.

8. The apparatus of claim 1, wherein the operations further comprise:
detecting the first mobile device in proximity to the physical environment; and
determining the first user of the first mobile device.

9. The apparatus of claim 1, wherein the operations further comprise:
detecting the second mobile device in proximity to the physical environment; and
determining the second user of the second mobile device, wherein the managing the second interactions comprise sending an alert to maintain the physical environment commensurate with the second intensity of usage information.

10. A system comprising:
a first mobile device;
a second mobile device; and
a server communicatively connected with the mobile device, the server comprising:
a processor; and
a memory coupled with the processor and storing executable instructions that when executed by the processor cause the processor to effectuate operations comprising:
obtaining first intensity of usage information according to first sensor data from a first sensor collected according to a first user of a first mobile device detected in proximity to a physical environment and second intensity of usage information according to second sensor data from a second sensor collected according to a second user of a second mobile device detected in proximity to the physical environment, wherein the first sensor and the second sensor are different sensors; and
based on the first intensity of usage information and the second intensity of usage information, managing first interactions associated with first usage, by the first user, of a first sub-environment of a plurality of sub-environments of the physical environment and second interactions associated with second usage, by the second user, of the first sub-environment of the plurality of sub-environments.

11. The system of claim 10, wherein the first sensor data from the first sensor is collected according to a first profile associated with the first user of the first mobile device, and wherein the second sensor data from the second sensor is collected according to a second profile associated with the second user of the second mobile device.

12. The system of claim 10, wherein the managing the first interactions comprises sending an alert to maintain the physical environment commensurate with the first intensity of usage information.

13. The system of claim 10, wherein the managing the first interactions comprises sending a message to the first mobile device, wherein the message provides an offer for the first user to upgrade seating in a venue.

14. The system of claim 10, wherein the operations further comprise:
detecting the first mobile device in proximity to the physical environment; and
determining the first user of the first mobile device.

15. The system of claim 10, wherein the operations further comprise:
detecting the second mobile device in proximity to the physical environment; and
determining the second user of the second mobile device, wherein the managing the second interactions comprise sending an alert to maintain the physical environment commensurate with the second intensity of usage information.

16. A non-transitory computer-readable storage medium storing computer executable instructions that when executed by a computing device cause said computing device to effectuate operations comprising:

obtaining first intensity of usage information according to first sensor data from a first sensor collected according to a first user of a first mobile device detected in proximity to a physical environment and second intensity of usage information according to second sensor data from a second sensor collected according to a second user of a second mobile device detected in proximity to the physical environment; and based on the first intensity of usage information and the second intensity of usage information, managing first interactions associated with first usage, by the first user, of a first sub-environment of a plurality of sub-environments of the physical environment and second interactions associated with second usage, by the second user, of the first sub-environment of the plurality of sub-environments.

17. The non-transitory computer-readable storage medium of claim 16, wherein the first sensor and the second sensor are different sensors.

18. The non-transitory computer-readable storage medium of claim 16, wherein the first sensor data from the first sensor is collected according to a first profile associated with the first user of the first mobile device, and wherein the second sensor data from the second sensor is collected according to a second profile associated with the second user of the second mobile device.

19. The non-transitory computer-readable storage medium of claim 16, wherein the operations further comprise:

detecting the first mobile device in proximity to the physical environment;

determining the first user of the first mobile device. detecting the second mobile device in proximity to the physical environment; and determining the second user of the second mobile device, wherein the managing the second interactions comprise sending an alert to maintain the physical environment commensurate with the second intensity of usage information.

20. The non-transitory computer-readable storage medium of claim 16, wherein the managing the first interactions comprises sending an alert to maintain the physical environment commensurate with the first intensity of usage information.

* * * * *